(12) United States Patent
Bryant et al.

(10) Patent No.: US 6,411,998 B1
(45) Date of Patent: *Jun. 25, 2002

(54) WORLD WIDE WEB INTERNET DELAY MONITOR

(75) Inventors: Raymond Morris Bryant; Richard Dale Hoffman, both of Austin, TX (US); Samuel Kahn, Mountain View, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/924,987

(22) Filed: Sep. 8, 1997

(51) Int. Cl.$^7$ ............................................. G06F 15/173
(52) U.S. Cl. ...................................... 709/224; 370/216
(58) Field of Search ......................... 395/200.54, 200.3; 709/217, 218, 224, 248, 235, 200, 203, 245, 246, 223; 705/14, 32; 370/229, 216, 469, 230; 375/225; 345/115; 707/104; 713/200

(56) References Cited

U.S. PATENT DOCUMENTS

| | | | | |
|---|---|---|---|---|
| 5,446,680 A | * | 8/1995 | Sekiya et al. ............ | 395/200.3 |
| 5,724,514 A | * | 3/1998 | Arias ......................... | 709/200 |
| 5,774,670 A | * | 6/1998 | Montulli ................. | 395/200.57 |
| 5,793,976 A | * | 8/1998 | Chen et al. ............ | 395/200.54 |
| 5,796,633 A | * | 8/1998 | Burgess et al. ........ | 364/551.01 |
| 5,796,952 A | * | 8/1998 | Davis et al. ................ | 709/224 |
| 5,802,106 A | * | 9/1998 | Packer ....................... | 375/225 |
| 5,802,303 A | * | 9/1998 | Yamaguchi ............ | 395/200.54 |
| 5,806,043 A | * | 9/1998 | Toader ........................ | 705/14 |
| 5,812,780 A | * | 9/1998 | Chen et al. ............ | 395/200.54 |
| 5,815,667 A | * | 9/1998 | Chien et al. ........... | 395/200.62 |
| 5,822,543 A | * | 10/1998 | Dunn et al. ............. | 395/200.54 |
| 5,864,871 A | * | 1/1999 | Kitain et al. ............... | 707/104 |
| 5,875,296 A | * | 2/1999 | Shi et al. ................. | 395/188.01 |
| 5,878,213 A | * | 3/1999 | Bittinger et al. ............ | 709/203 |
| 5,905,872 A | * | 5/1999 | DeSimone et al. .......... | 709/245 |
| 5,912,878 A | * | 6/1999 | Park et al. ................... | 370/229 |
| 5,958,018 A | * | 9/1999 | Eng et al. .................... | 709/246 |
| 5,996,007 A | * | 11/1999 | Klug et al. .................. | 709/218 |
| 6,006,260 A | * | 12/1999 | Barrick, Jr. et al. ........ | 709/224 |
| 6,011,537 A | * | 1/2000 | Sloitznick ................... | 345/115 |
| 6,031,818 A | * | 2/2000 | Lo et al. ...................... | 370/216 |
| 6,032,189 A | * | 2/2000 | Jinzenji et al. ............. | 709/235 |
| 6,078,953 A | * | 6/2000 | Vaid et al. ................... | 709/223 |
| 6,078,956 A | * | 6/2000 | Bryant et al. ............... | 709/224 |
| 6,115,393 A | * | 9/2000 | Engel et al. ................. | 370/469 |

OTHER PUBLICATIONS

Dilley et al, Measurement Tools and Modeling Techniques for Evaluating Web Server Performance, 1996.*

Dilley et al, Measurement Tools & Modeling Techniques fro Evaluating Web Server Performance www.hpl.hp.com/96/HPL–96–161.pdf, Dec. 1996.*

Onunga et al, A simple adaptive data link protocol for performance enhancement on networks with —variable quality links. IEEE, 1991.*

* cited by examiner

*Primary Examiner*—Mark H. Rinehart
*Assistant Examiner*—Thong Vu
(74) *Attorney, Agent, or Firm*—Jeffrey S. LaBaw; Joseph R. Burwell; David Judson

(57) ABSTRACT

A method of determining Internet delays associated with requests from a Web client connectable to a Web server. The method begins at the Web server in response to a first HTTP request. In particular, the Web server serves a response to the first HTTP request and logs a server processing time associated with serving that response. After the response is delivered back to the Web client that initiated the request, an end user response time associated with the first HTTP request is calculated at the Web client. Upon a new HTTP request (typically the next one), the end user response time associated with the first HTTP request is then passed from the Web client to the Web server in a cookie. The Internet delay associated with the first HTTP request is then calculated by subtracting the server processing time from the end user response time.

22 Claims, 4 Drawing Sheets

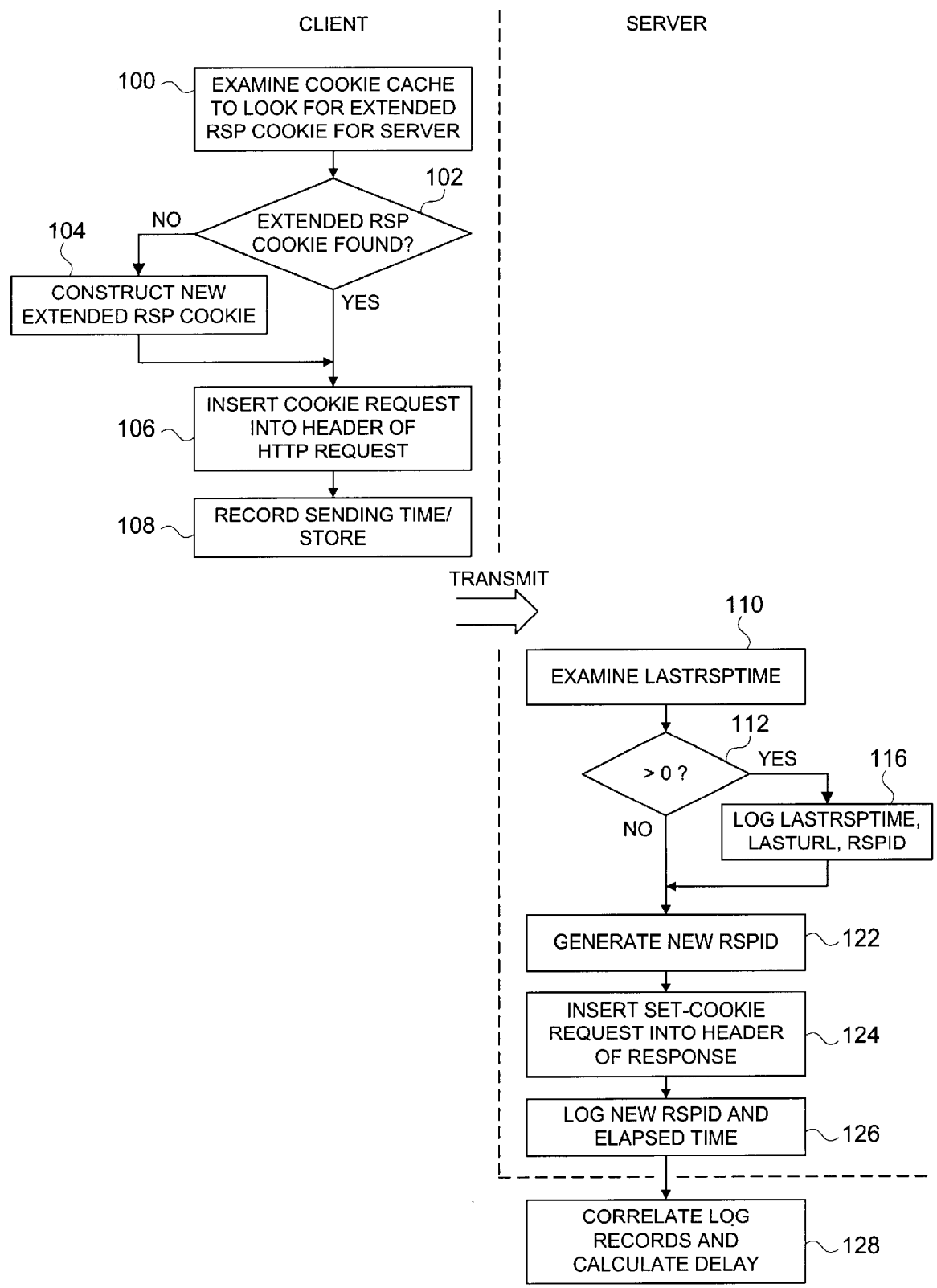

WORLD WIDE WEB INTERNET DELAY MONITOR

BACKGROUND OF THE INVENTION

1. Technical Field

The present invention relates generally to computer networks and more particularly to a method and system for monitoring and collecting data in a client-server computer network such as the Internet.

2. Description of the Related Art

The World Wide Web is the Internet's multimedia information retrieval system. In the Web environment, client machines effect transactions to Web servers using the Hypertext Transfer Protocol (HTTP), which is a known application protocol providing users access to files (e.g., text, graphics, images, sound, video, etc.) using a standard page description language known as Hypertext Markup Language (HTML). HTML provides basic document formatting and allows the developer to specify "links" to other servers and files. In the Internet paradigm, a network path to a server is identified by a so-called Uniform Resource Locator (URL) having a special syntax for defining a network connection. Use of an HTML-compatible browser (e.g., Netscape Navigator or Microsoft Internet Explorer) at a client machine involves specification of a link via the URL. In response, the client makes a request to the server identified in the link and receives in return a document formatted according to HTML.

The time period between the issuing of an HTTP request from the browser and the return of the requested document (or some component thereof) is known as the end user "response time." The response time is a function of the time spent servicing the HTTP request at the Web server together with the network transmission time to and from the server. The network transmission time is sometimes referred to as the "Internet delay."

Internet delay time could be measured in environments where the clocks of the client and server machines are synchronized or where an external time reference is available to both the client and the server. Given the diverse nature of the Internet environment, however, such solutions are impractical because these criteria could not be met for all of the clients of a large web server. One possible alternative would be to place a special client (a so-called "transaction monitor") on the Internet and have the transaction monitor periodically issue a request to the server of interest. The transaction monitor would have to be built with Internet delay time instrumentation included. Measured Internet delays for this client would then be presumed to be indicative of Internet delays that actual clients encountered. Such an approach also has significant drawbacks. The transaction monitor would presumably hook into the Internet at a fixed site or ISP (or at most a small number of sites). The Internet delay times measured by the transaction monitor would thus represent only a small fraction of the total paths that may be used to connect to a large server. In addition, such a transaction monitor would be useless for resolving questions about the Internet delay times for requests issued by way of an ISP that the transaction monitor is not currently using. Further, the transaction monitor would have to be constructed to use test transactions against the server. Test transactions are suspect in that they may omit entire classes of operations, and they can be difficult to create if the mission of the Web server is considered critical or secure (e.g., financial transactions).

There remains a need to provide an Internet delay monitor that overcomes these and other problems associated with the known prior art.

SUMMARY OF THE INVENTION

It is thus a primary object of the present invention to measure Internet delay encountered by a an HTTP request as it moves from a Web browser to a Web server and returns.

It is another primary object of this invention to determine how much of a response time for a particular Web request is due to Internet delay.

It is another object of this invention to implement Internet delay monitoring capability without resort to synchronized clocks at the client and server machines, to use of an external time reference, or to implementation of a dedicated transaction monitor.

Another important object of this invention is to measure the Internet delay characteristics of the network, in general, and a given URL, in particular, to enable Web site operators to evaluate quality of service.

It is still another important object of this invention to facilitate the collection of Internet delay data and statistics for use by Web site operators.

It is yet another object of this invention to enable suppliers of service on the Internet to measure the quality of that service. One of the components of quality of service is response time to a user's request. By using the Internet delay monitor described in this invention, service providers will be able to determine whether poor response time is due to delays on the Internet or delays at the provider's Web server.

These and other objects of the invention are provided in a method of determining Internet delays associated with requests from a Web client connectable to a Web server. The method begins at the Web server in response to a first HTTP request. In particular, the Web server serves a response to the first HTTP request and logs a server processing time associated with serving that response. After the response is delivered back to the Web client that initiated the request, an end user response time associated with the first HTTP request is calculated at the Web client. Upon a new HTTP request (typically the next one), the end user response time associated with the first HTTP request is then passed from the Web client to the Web server in a special cookie. The Web server then logs the response time of the first request. The Internet delay associated with the first request can then be calculated by matching the two log records and subtracting the server processing time from the first log record from the response time from the second log record.

This operation is preferably implemented by associating a unique response identifier (herein called RSPID) with each response generated by the server. The RSPID is sent to the client as part of each response to a request; this RSPID is also logged by the server along with the server processing time for the request. The client includes the RSPID along with the response time in the cookie that is sent to the Web server on the subsequent request. The server then logs the response time and the RSPID on receipt of the cookie. Well-known methods are used to match the records with corresponding RSPID's during log analysis to then calculate the Internet delay.

Another aspect of the invention is the provision of a computer program product for determining Internet delay associated with an HTTP request from a Web client connectable to a Web server in a computer network. The computer program product includes first program code means supported at the Web server and responsive to a first HTTP request from the Web client for logging a server processing time associated with serving the response. The product further includes second program code means supported at the Web server and responsive to receipt of a second HTTP request from the Web client to the Web server for retrieving data defining the response time of the first HTTP request and using that data to calculate the Internet delay associated with the first HTTP request. The second program code means preferably calculates the Internet delay associated with the first HTTP request by subtracting the server processing time from the response time. As described above, preferably the data defining the response time of the first HTTP request is contained in a cookie of the second HTTP request.

The foregoing has outlined some of the more pertinent objects and features of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the Preferred Embodiment.

BRIEF DESCRIPTION OF THE DRAWINGS

For a more complete understanding of the present invention and the advantages thereof, reference should be made to the following Detailed Description taken in connection with the accompanying drawings in which:

FIG. 6 is a flowchart illustrating the various operations of the Web client and the Web server during the present invention.

DETAILED DESCRIPTION OF THE PREFERRED EMBODIMENT

Figure 1:
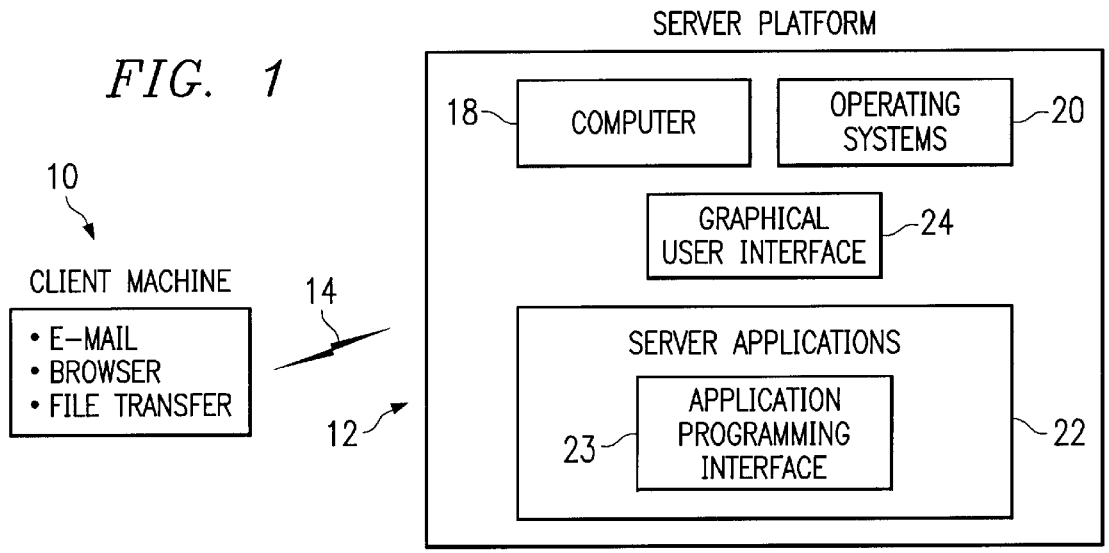
FIG. 1 is a representative system in which the present invention is implemented.

A representative system in which the present invention is implemented is illustrated in FIG. 1. A client machine 10 is connected to a Web server platform 12 via a communication channel 14. For illustrative purposes, channel 14 is the Internet, an Intranet or other known network connection. Web server platform 12 is one of a plurality of servers which are accessible by clients, one of which is illustrated by machine 10. A representative client machine includes a browser 16, which is a known software tool used to access the servers of the network. Representative browsers include, among others, Netscape Navigator (Version 2.0 and higher), Microsoft Internet Explorer (Version 3.0 and higher) or the like, each of which are "off-the-shelf" or downloadable software programs. The Web server platform (sometimes referred to as a "Web" site) supports files in the form of hypertext documents and objects. In the Internet paradigm, a network path to a server is identified by a so-called Uniform Resource Locator (URL). The World Wide Web is the Internet's multimedia information retrieval system. In particular, it is a collection of servers of the Internet that use the Hypertext Transfer Protocol (HTTP), which provides users access to files using Hypertext Markup Language (HTML).

A representative Web Server platform 12 comprises an IBM RISC System/6000 computer 18 (a reduced instruction set of so-called RISC-based workstation) running the AIX (Advanced Interactive Executive Version 4.1 and above) Operating System 20 and a Web server program 22, such as Netscape Enterprise Server Version 2.0, that supports interface extensions. The platform 12 also includes a graphical user interface (GUI) 24 for management and administration. The various models of the RISC-based computers are described in many publications of the IBM Corporation, for example, RISC System/6000, 7013 and 7016 POWERstation and POWERserver Hardware Technical Reference, Order No. SA23-2644-00. AIX OS is described in AIX Operating System Technical Reference, published by IBM Corporation, First Edition (November 1985), and other publications. While the above platform is useful, any other suitable hardware/operating system/Web server combinations may be used.

Figure 2:
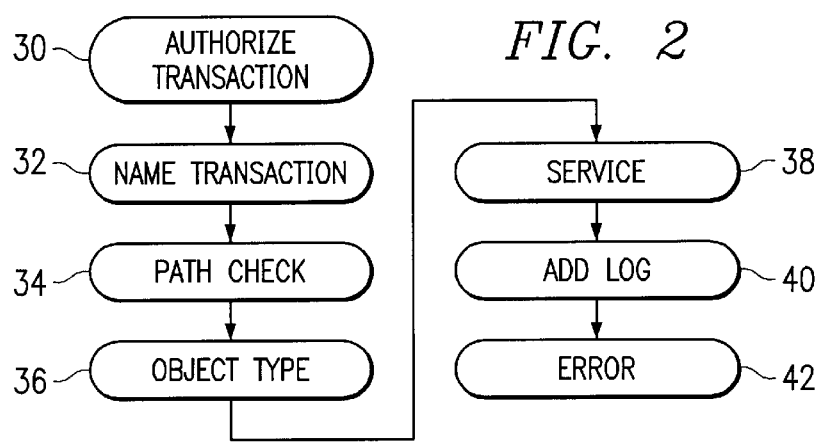
FIG. 2 is a flowchart illustrating the conventional processing associated with an HTTP request from the Web client to the Web server shown in FIG. 1.

The Web Server accepts a client request and returns a response. The operation of the server program 22 is governed by a number of server application functions (SAFs), each of which is configured to execute in a certain step of a sequence. This sequence, illustrated in FIG. 2, begins with authorization translation (AuthTrans) 30, during which the server translates any authorization information sent by the client into a user and a group. If necessary, the AuthTrans step may decode a message to get the actual client request. At step 32, called name translation (NameTrans), the URL associated with the request may be kept intact or it can be translated into a system-dependent file name, a redirection URL or a mirror site URL. At step 34, called path checks (PathCheck), the server performs various tests on the resulting path to ensure that the given client may retrieve the document. At step 36, sometimes referred to as object types (ObjectType), MIME (Multipurpose Internet Mail Extension) type information (e.g., text/html, image/gif, etc.) for the given document is identified. At step 38, called Service (Service), the Web server routine selects an internal server function to send the result back to the client. This function can run the normal server service routine (to return a file), some other server function (such as a program to return a custom document) or a CGI program. At step 40, called Add Log (AddLog), information about the transaction is recorded. At step 42, called Error, the server responds to the client when it encounters an error. Further details of these operations may be found in the Netscape Web Server Programmer's Guide, Chapter 5, which is incorporated herein by reference. The time spent carrying out the various functions of FIG. 2 (namely, the time spent by the Web server serving the HTTP request) is referred to below as the SERVER_PROCESSING_TIME.

Thus, the Web server 18 includes a known set of server application functions (SAFs). These functions take the client's request and other configuration data of the server as input and return a response to the server as output. Referring back to FIG. 1, the Web server 18 also includes an Application Programming Interface (API) 26 that provides extensions to enable application developers to extend and/or customize the core functionality thereof (namely, the SAFs) through software programs commonly referred to as "plug-ins."

Figure 3:
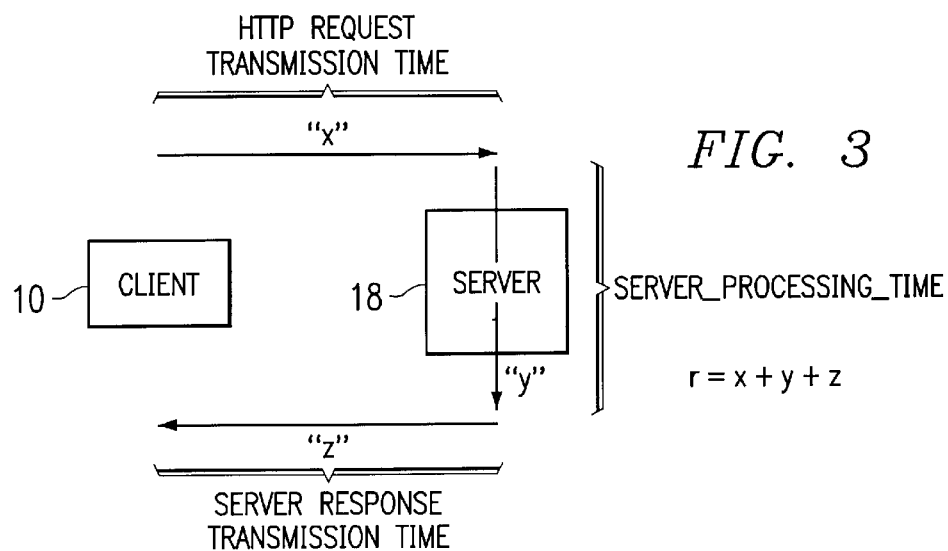
FIG. 3 is a simplified timing diagram illustrating how end user response time is calculated.

The present invention is a technique for measuring total Internet delay encountered by a WWW request as it moves from the Web client (and, in particular, the browser) to a Web server and returns. In accordance with the invention, the Internet delay associated with a given request is calculated by subtracting the amount of processing time within the Web server from the "response time" as seen by the end user on the Web client. FIG. 3 illustrates the various components that comprise the "response time" of a given HTTP request. A first time "x" represents the time to transfer the HTTP request (usually a GET or POST request) from the Web client to the Web server. A second time "y" represents the server processing time (SERVER_PROCESSING_TIME), which was described above with respect to the flowchart of FIG. 2. A third time "z" then represents the time to transfer a specified event in the response to the HTTP request back to the Web client. The specified event may be first packet return, last HTML byte, last .gif byte, or some intermediate event within the transfer. Thus, the response time "r" equals "x+y+z." The "Internet delay," which is that portion of the response time associated with the actual transmission over the Internet itself (as opposed to the time spent within the server for processing), is then the value "x+z".

Figure 4:
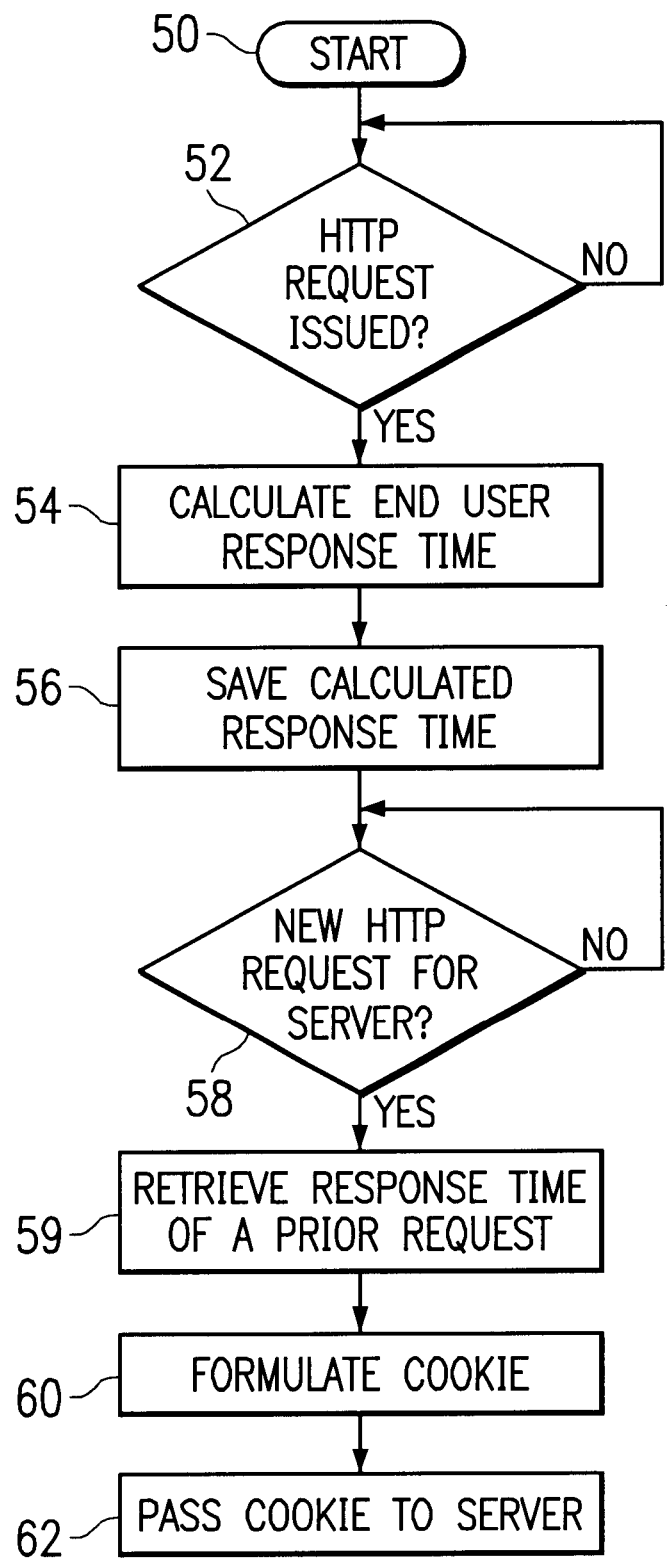
FIG. 4 is a flowchart illustrating the basic operation of the present invention.
Figure 5:
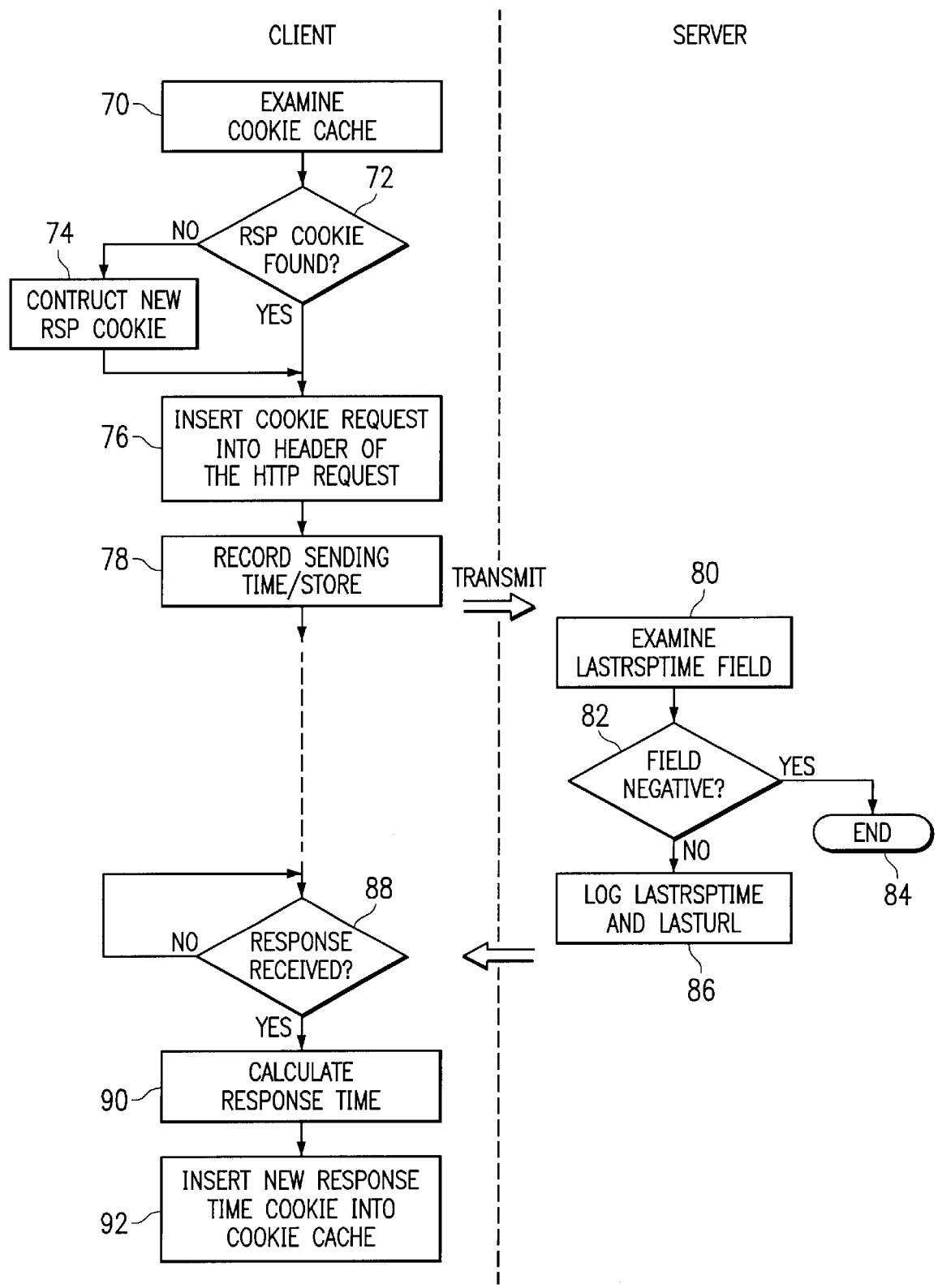
FIG. 5 is a flowchart illustrating the various operations of the Web client and the Web server in response to a user HTTP request.

A preferred embodiment of calculating the end user response time (which is used in the Internet delay calculation) is illustrated in the simplified flowchart of FIG. 4. The method begins at step 50. At step 52, a test is run repeatedly to determine whether a given HTTP request (e.g., a GET or POST) has been issued from the client to a given server. If the outcome of the test at step 52 is positive, the routine continues at step 54 to calculate the response time "x+y+z." A preferred technique for performing this calculation is described below with respect to the flowchart of FIG. 5. At step 56, the calculated response time is saved at the client. A test is then run at step 58 to determine if a new HTTP request for the given server has been issued. If the result of the test at step 58 is negative, the routine cycles and repeatedly tests for this condition. If, however, the result of the test at step 58 is positive, the routine continues at step 59 to retrieve the end user response time calculated at step 54 (which will usually be the response time associated with the most-recent visit to the server), and to formulate a response time protocol (RSP) cookie at step 60. At step 62, the cookie is then passed to the Web server, preferably within the new HTTP request itself. This completes the processing of the end user response time calculation.

Thus, before the Internet delay is calculated for a given HTTP request, an end user response time associated with that request is first calculated as the HTTP request is being processed. The end user response time is calculated at the Web client but not passed to the Web server until a subsequent HTTP request (typically, a next request). Preferably, the response time information is passed to the Web server in a special cookie associated with the subsequent HTTP request. A more detailed description of this process is now provided.

In a preferred embodiment, a special "response time cookie" (herein referred to as the "RSP cookie") is associated with the Web client browser and processed by the Web server. The RSP cookie comprises the following two fields of data (and possibly others, as will be described):

LASTRSPTIME the response time of the last request; and

LASTURL the URL of the last request

The particular format of LASTRSPTIME is not significant; however, for this example, it is assumed to be an integer representing the number of milliseconds required for the response. Web servers are divided into two classes: instrumented and non-instrumented. Instrumented servers are servers that implement the RSP cookie protocol. It is presumed that there is some mechanism used to inform the browser as to whether or not a particular server is an instrumented server. The default is for a Web server to be non-instrumented. Web client browsers that support the RSP cookie protocol are called instrumented browsers. For the rest of this discussion, it is assumed that the HTTP request originates from an instrumented browser.

The end user response time calculation protocol then operates as follows. As noted above, the information resulting from this protocol (namely, the end user response time for a given request) is then later used to calculate Internet delay associated with the request. Whenever an instrumented server is contacted, the browser examines the cookie cache looking for a RSP cookie for that server. This is step 70. A test is then made at step 72 to determine is an RSP cookie is found. If no RSP cookie is found, the routine continues at step 74 with the browser constructing a new RSP cookie for that server by initializing LASTRSPTIME to −1 and LASTURL to null. If an RSP cookie is found (i.e. the output of the test at step 72 is positive), or after step 74, the browser includes the current contents of the RSP cookie for that server by inserting a "Cookie:" request into the header of the HTTP request and filling in the values for LASTRSPTIME and LASTURL from the cookie cache. This is step 76. At step 78, the browser records the time when the request is sent according to the time clock on the client system where the browser is running and stores this value in storage local to the browser (or in some other way accessible to the browser).

The routine then continues with the server processing. In particular, when the cookie (associated with the HTTP request) is received, the routine continues at step 80 and examines the LASTRSPTIME field. A test is then made at step 82 to determine if this field is negative. If so, the server processing ends, as indicated by step 84. If the outcome of the test at step 82 indicates that the LASTRSPTIME field is non-negative, the routine continues at step 86 with the server logging the LASTRSPTIME field and the LASTURL and any other information from the request the server might find appropriate (e.g. the domain name of the requester). To minimize the total amount of data collected, the server may choose to randomly sample the recorded response times and log only a subset of the times. Postmortem analysis tools would then examine the response time log and produce response time statistics per URL.

Processing then continues at the client. In particular, at step 88 at test is made to determine whether a response has been received from an instrumented server. If the outcome of the test at step 88 is negative, the step cycles and continues to test. If, however, the outcome of the test at step 88 indicates that a response to the HTTP request is received from an instrumented server, the routine continues at step 90. In this step, the browser subtracts from the current client clock time the time that the request was sent. This time, as well as the "referring URL," are recorded in the RSP cookie for that server at step 92. This completes the end user response time processing.

It should be appreciated that the "response time" is not necessarily the time between the initiation of the HTTP request at the client and the first or last packet return associated with the target document. This invention could also be used to record and collect intermediate response times such as: response time of first data arrival, response time HTML delivery complete, response time of all gif's delivered, or some other intermediate response time. If the domain name of the requester is logged as part of the server log record, one could also use this tool to determine whether poor response times are due to a particular ISP or other route into the server.

With the above as background, the inventive technique for measuring total Internet delay is now described. As previously noted, the present invention takes advantage of the client-side calculation of the end user response time to determine the total "Internet delay" encountered by a World Wide Web request as it moves from a Web browser to a Web server and returns. This is the "x+z" calculation described above with respect to FIG. 3. The solution provides a simple way to determine how much of the response time for a particular Web request is due to Internet delay.

The solution to this problem assumes the existence of an instrumented browser as described above. The present invention extends the "response time cookie" described above with information required to calculate the Internet delay encountered by the request. To this end, an "extended RSP cookie" comprises the following three fields of data:

LASTRSPTIME the response time of the last request;
LASTURL the URL of the last request; and
RSPID an identifier generated by the server uniquely identifying a particular response.

The format of RSPID is not significant; however, for this illustrative example, it is assumed to be an integer representing the count of requests serviced by the server where the response was generated since the server was first started. It is assumed that a 32 bit counter is sufficiently large that overflow is not a problem for distinguishing between responses. The RSPID is kept with the other fields of the extended RSP cookie and is sent to the instrumented server as part of each request.

The protocol of the "Internet delay" monitor of this invention is illustrated in detail in the logic flow diagram shown in FIG. 6. The left side of the diagram is the client (i.e. the browser) operation; the right side of the diagram is the server operation. Whenever an instrumented server is contacted, the browser examines the cookie cache looking for an extended RSP cookie for that server. This is step 100. A test is then made at step 102 to determine if an extended RSP cookie is found. If no extended RSP cookie is found, the routine continues at step 104 with the browser constructing a new extended RSP cookie for that server by initializing LASTRSPTIME to −1, LASTURL to null and RSPID to −1. If an extended RSP cookie is found (i.e. the output of the test at step 102 is positive), or after step 104, the browser includes the current contents of the extended RSP cookie for that server by inserting a "Cookie:" request into the header of the HTTP request and filling in the values for LASTRSPTIME, LASTURL and RSPID from the cookie cache. This is step 106. At step 108, the browser records the time when the request is sent according to the time clock on the client system where the browser is running and stores this value in storage local to the browser (or in some other way accessible to the browser).

Processing then continues in the server. When the cookie (associated with the HTTP request) is received, the routine continues at step 110 and examines the LASTRSPTIME field. A test is then made at step 112 to determine if this field is negative. If so, the server processing continues with step 122. If the outcome of the test at step 112 indicates that the LASTRSPTIME field is non-negative, the routine continues at step 116 with the server logging the LASTRSPTIME field, the LASTURL, the RSPID from the cookie, and any other information from the request the server might find appropriate (e.g. the domain name of the requester). The record logged at step 116 is called R1. At step 122, the server then generates a new RSPID associated with the current response. At step 124, the server includes a Set-Cookie request of the form:

Set-Cookie: RSPID=nnnnnnn; path=/ in the header of the response. This causes the browser to record the RSPID in the cookie cache. In addition, at step 126, the server logs the new RSPID along with the (server-local) elapsed clock time between when the request arrived and the response was sent. This is the SERVER_PROCESSING_TIME illustrated in the flowchart of FIG. 2. For reference below, the log record generated in step 126 is called R2.

To determine the Internet delay, the routine continues in step 128. In particular, postmortem analysis tools then correlate the log records R1 and R2 that contain the same RSPID. Missing R1 records indicate that the extended RSP cookie for that RSPID has either been discarded by the browser or has not yet been received. Corresponding R2 records would either be discarded or set aside for later use. The Internet delay time is then calculated at step 130 as follows:

Internet_Delay_Time=LASTRSPTIME−SERVER_PROCESSING_TIME, where LASTRSPTIME comes from record R1 and SERVER_PROCESSING_TIME comes from record R2.

If response times are sampled (i.e. not all extended RSP Cookies are logged), the server should choose either to log both R1 and R2 records associated with a particular RSPID or to log neither. This is done to simplify the postmortem analysis tools. Since Internet delay statistics are likely to be sampled by the Web server in any case, the loss of an R1 record given the existence of an R2 record is not considered harmful.

Naming conventions for the extended RSP cookie field RSPID may vary depending on the conventions observed by the Web server. For example, to communicate this value to a server-side JavaScript program running on a Netscape Enterprise server, this field would be named:

NETSCAPE_LIVEWIRE.RSPID

It should be noted that when the cookie cache is searched for a RSP cookie, the normal path matching of the Netscape cookie protocol is disabled. Equivalently, all RSP cookies are preferably stored with a path of "/". The effect of this is that the RSP cookie is sent as part of every request to an instrumented server. There is potentially a separate RSP cookie for each instrumented server that the Web browser has contacted, subject to the limits of storage on the client machine. Well known methods, such as expiration dates, can be used to discard RSP cookies when they are likely to no longer be useful. A discarded RSP cookie means that a response time observation has been lost. Since RSP time statistics are likely to be sampled by the Web server in any case, however, the loss of a response time observation due to this event is not considered harmful.

The present invention provides numerous advantages. As Internet commerce becomes more pervasive, suppliers of service on the Internet will need to measure the quality of that service. One of the components of quality of service is response time to a user's request. By using the Internet delay monitor described in this invention, service providers will be able to determine whether poor response time is due to delays on the Internet or delays at the provider's Web server.

One of the preferred implementations of the scheme of the invention is as a set of instructions (program code) in a code module resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

As used herein, "Internet client" should be broadly construed to mean any computer or component thereof directly or indirectly connected or connectable in any known or later-developed manner to a computer network, such as the Internet. The term "Internet server" should also be broadly construed to mean a computer, computer platform, an adjunct to a computer or platform, or any component thereof. Of course, a "client" should be broadly construed to mean one who requests or gets the file, and "server" is the entity which downloads the file.

One of ordinary skill will also recognize that the inventive features of the present invention may be applied to other Internet services as well as to an HTTP-compliant browser. Thus, the invention may be useful in monitoring Internet delay associated with the sending or retrieval of e-mail (via the simple mail transfer protocol, or SMTP), associated with a file transfer (via the file transfer protocol, or FTP), associated with the posting to a bulletin board (via the network news transfer protocol, or NNTP), or associated with remote terminal access (Telnet)

Having thus described our invention, what we claim as new and desire to secure by Letters Patent is set forth in the following claims.

What is claimed is:

1. A method of determining an Internet delay associated with requests from a Web client connectable to a Web server, comprising the steps of:

at the Web server, and in response to a first HTTP request from the Web client, serving a response to the first HTTP request and logging a server processing time associated with serving the response;

at the Web client, calculating an end user response time associated with the first HTTP request by measuring a length of time from issuance of the first HTTP request until receipt of the requested data from the Web server;

upon a next HTTP request, passing the end user response time associated with the first HTTP request from the Web client to the Web server; and calculating the Internet delay associated with the first HTTP request.

2. The method as described in claim 1 wherein the Internet delay associated with the HTTP request is calculated by subtracting the server processing time from the end user response time.

3. The method as described in claim 1 further including the step of maintaining at the Web server a unique identifier associated with each response generated by the Web server.

4. The method as described in claim 1 wherein the end user response time is passed to the Web server in a cookie.

5. The method as described in claim 4 wherein the cookie includes the unique identifier.

6. The method as described in claim 5 wherein the cookie also includes the URL of the Web server.

7. The method as described in claim 1 wherein the Web client includes a browser for issuing HTTP requests from the Web client to the Web server.

8. A method of determining an Internet delay associated with requests from a Web client connectable to a Web server, comprising the steps of:

at the Web server, and in response to a first HTTP request from the Web client, serving a response to the first HTTP request and logging a server processing time and a response identifier associated with serving the response;

at the Web client, calculating an end user response time associated with the first HTTP request by measuring a length of time from issuance of the first HTTP request until receipt of the requested data from the Web server;

upon a next HTTP request, passing the end user response time associated with the first HTTP request and the response identifier from the Web client to the Web server in a cookie; and calculating the Internet delay associated with the first HTTP request by subtracting the server processing time from the end user response time.

9. The method as described in claim 8 wherein the Web client includes a browser for issuing HTTP requests from the Web client to the Web server.

10. The method as described in claim 8 wherein the cookie further includes the URL of the Web server.

11. A computer program product in a computer-readable medium for determining Internet delay associated with an HTTP request from a Web client connectable to a Web server in a computer network, comprising:

first program code means supported at the Web server and responsive to a first HTTP request from the Web client to the Web server for logging a server processing time associated with serving a response; and second program code means supported at the Web server and responsive to receipt of a second HTTP request from the Web client to the Web server for retrieving data defining the response time of the first HTTP request and using that data to calculate the Internet delay associated with the first HTTP request.

12. The computer program product as described in claim 11 wherein the second program code means calculates the Internet delay associated with the first HTTP request by subtracting the server processing time from the response time.

13. The computer program product as described in claim 11 wherein the data defining the response time of the first HTTP request is contained in a cookie of the second HTTP request.

14. The computer program product as described in claim 13 wherein the cookie further includes the URL of the Web server.

15. The computer program product as described in claim 13 wherein the cookie further includes a unique identifier associated with the response.

16. A computer for use as a server in a computer network having a Web client connectable to the computer, comprising:

a processor;

an operating system;

a Web server program;

first program code means responsive to a first HTTP request from the Web client to the Web server program for logging a server processing time associated with serving the response; and second program code means responsive to receipt of a second HTTP request from the Web client to the Web server program for retrieving data defining the response time of the first HTTP request and using that data to calculate the Internet delay associated with the first HTTP request.

17. The computer as described in claim 16 wherein the second program code means calculates the Internet delay associated with the first HTTP request by subtracting the server processing time from the response time.

18. The computer as described in claim 16 wherein the data defining the response time of the first HTTP request is contained in a cookie of the second HTTP request.

19. The computer as described in claim 18 wherein the cookie also includes the URL of the Web server.

20. The computer as described in claim 18 wherein the cookie further includes a unique identifier associated with the response.

21. A method of determining an Internet delay associated with requests from a client connectable to a server, comprising the steps of:

at the server, and in response to a first transfer request from the client, serving a response to the first transfer request and logging a server processing time associated with serving the response;

at the client, calculating an end user response time associated with the first transfer request by measuring a length of time from issuance of the first transfer request until receipt of the requested data from the server;

upon a next transfer request, passing the end user response time associated with the first transfer request from the client to the server; and calculating the Internet delay associated with the first transfer request.

22. The method as described in claim 21 wherein the transfer protocol is selected from the group of transfer protocols consisting of HTTP, SMTP, FTP, NMTP and Telnet.

* * * * *